United States Patent [19]

Boldt

[11] 4,251,759
[45] Feb. 17, 1981

[54] RELATIVE MOTION MONITOR

[75] Inventor: Robert R. Boldt, Taylor Ridge, Ill.

[73] Assignee: Agridustrial Electronics, Inc., Bettendorf, Iowa

[21] Appl. No.: 822,433

[22] Filed: Aug. 8, 1977

[51] Int. Cl.³ ............................................. H02P 3/08
[52] U.S. Cl. .................................. 318/490; 318/311; 318/449
[58] Field of Search ................... 318/490, 6, 310, 311, 318/312, 449, 450, 463; 340/259; 73/507

[56] References Cited

U.S. PATENT DOCUMENTS

| | | | |
|---|---|---|---|
| 2,718,631 | 9/1955 | Peck | 318/490 |
| 3,411,055 | 11/1968 | Carter et al. | 318/6 |
| 3,732,477 | 5/1973 | Cicatelli | 318/490 |
| 3,809,985 | 5/1974 | Krause et al. | 318/490 |
| 3,845,375 | 10/1974 | Stiebel | 318/463 |
| 4,025,832 | 5/1977 | Jones | 318/463 |
| 4,063,112 | 12/1977 | Dumbeck | 318/490 |

*Primary Examiner*—David Smith, Jr.

*Attorney, Agent, or Firm*—Trexler, Wolters, Bushnell & Fosse, Ltd.

[57] ABSTRACT

A monitor for detecting the relative velocity between a moving body or surface and a fixed body or surface includes a sensor having an actuator member, such as a wheel having magnetic pole pieces embedded therein and mounted for rotation proportional to the relative velocity between the two bodies or surfaces, and a pick-up member such as a coil or inductor, mounted adjacent the actuator for producing an electrical signal in response thereto. An electric circuit is connected to the pick-up member to receive the electrical signals therefrom and produce a plurality of indication signals in response thereto, including indication signals corresponding to the relative velocity being at or below one or more predetermined levels. The monitor also includes a plurality of indicators connected to the circuit and responsive to the indication signals therefrom, such as lights or audible alarms. In a preferred embodiment, the indicators also include an indicator such as a meter to provide a continuous indication of the proportion which the relative velocity bears to a desired value of the relative velocity.

8 Claims, 7 Drawing Figures

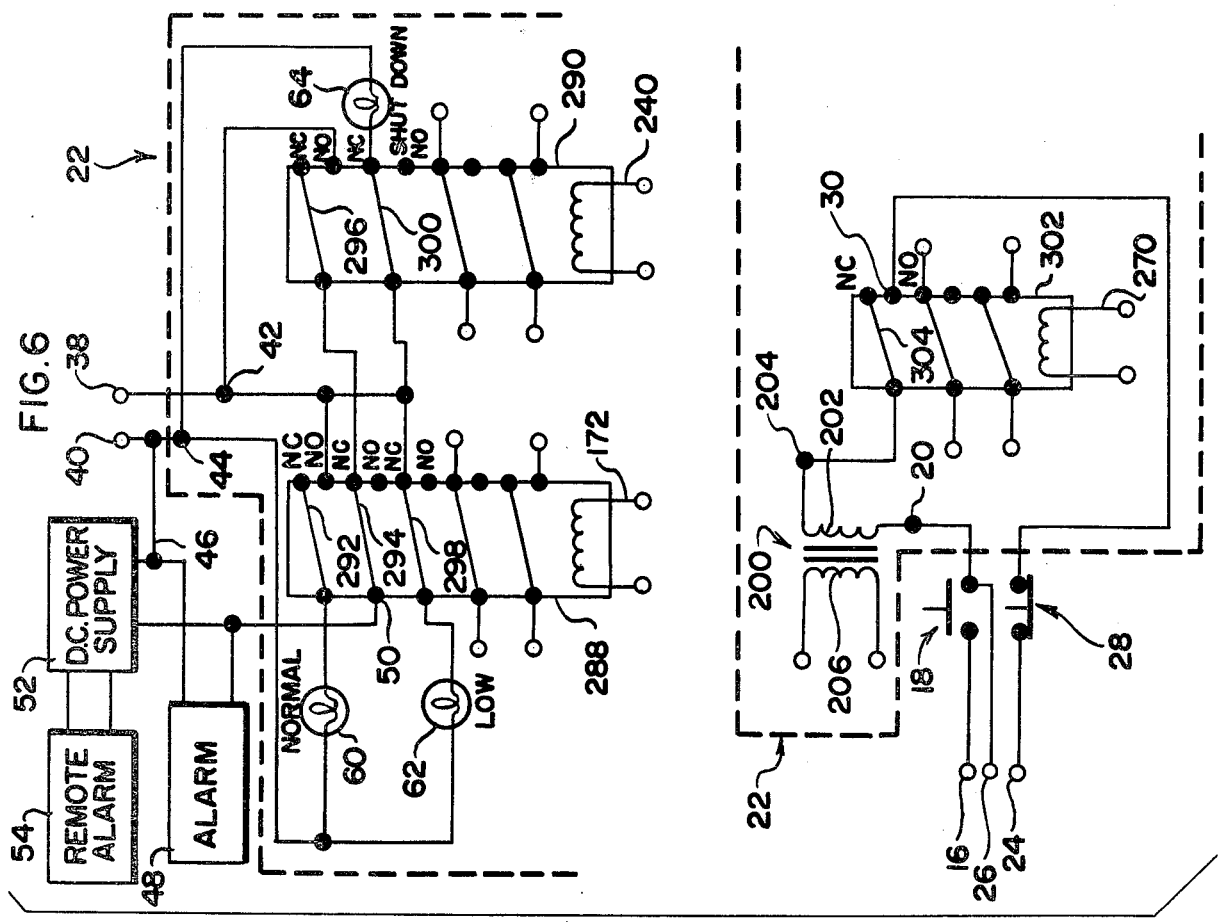
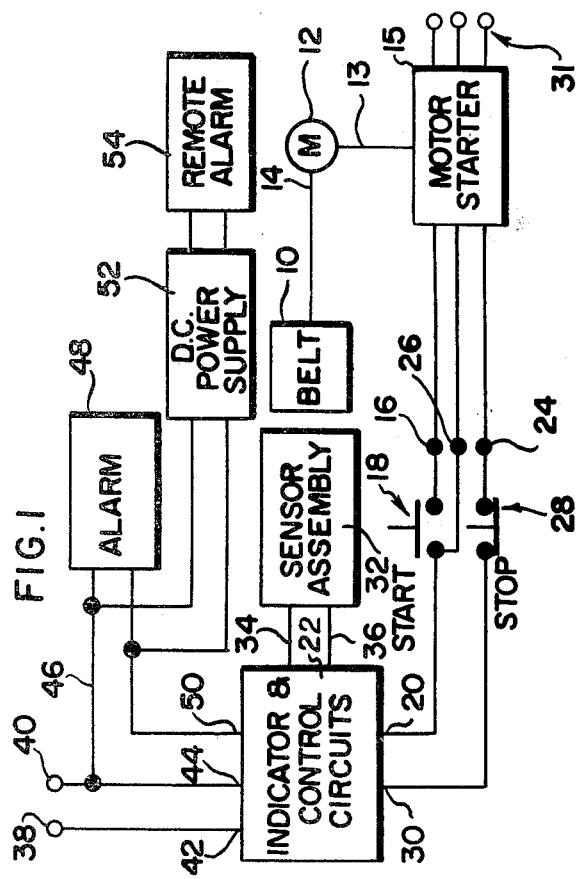
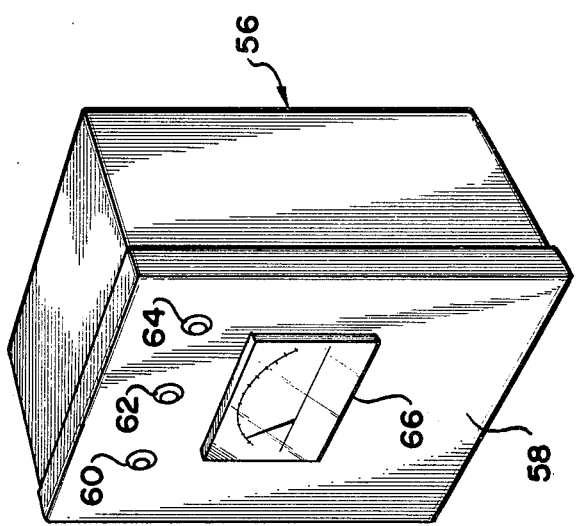

RELATIVE MOTION MONITOR

BACKGROUND OF THE INVENTION

This invention relates generally to a monitor for providing an indication of the relative velocity between a moving body or surface and a fixed body or surface. The disclosure will be facilitated by particular reference to monitoring the speed of a continuous moving member such as a belt.

In many types of machines, apparatus and systems, it is necessary or desirable to monitor the speed of a shaft, a belt, or the like, and to provide indications when the speed thereof varies from a preselected or desired speed, or to provide a continuous indication of the proportion that the speed thereof bears to a predetermined desired speed. Further, in some machines it is desirable to provide means for shutting down the machine when the speed of the moving member thereof being monitored falls below a certain preselected speed, indicating a possible malfunction of the machine.

For example, in a grain storage elevator, a relatively long continuous belt with buckets or the like attached thereto is used to carry grain to a loading port or the like, commonly located at the top of the storage bin. Such belts are often as much as 300 to 400 feet in length. The continuous belt is generally driven by an electric motor. Thus, it is desirable to provide a monitor for the continuous belt, to insure proper operation thereof. Monitoring the speed of a shaft or the like driving the belt is generally not satisfactory, as the belt may slip somewhat with respect to the shaft or other drive means. Moreover, it is desirable to monitor the speed of the belt directly, for comparison with the speed of the drive means, thereby determining the amount of slippage, if any, of the belt. In the case of monitoring the movement of the belt of a grain elevator, it is important to give a warning or other indication to an operator thereof in the event the belt jams or slips in a manner which might cause over-heating and/or a fire in the belt itself or in the drive means or motor. Clearly, it is important to minimize the possibilities of fire due to equipment failure in grain elevators. It is also known to provide a magnetic pick-up coil, actuated by the bucket bolts in the belt. However, this approach is unsatisfactory in the case where non-ferrous bolts are utilized, or the buckets are secured to the belt by other means than discrete, regularly spaced, ferrous fasteners. Also, results obtained by this method are subject to innaccuracies due to such factors as misaligned or missing buckets or bolts, irregularly indented bolts, imperfections or overlapping splices in the belt, and the like.

OBJECTS AND SUMMARY OF THE INVENTION

It is a general object of this invention to provide a monitor for providing an indication of the speed of a moving member which is adapted to produce at least a first indication when the speed is at or above a preselected level and a second indication when the speed is below the preselected level.

A more specific object of this invention is to provide a monitor for a continuous moving belt for giving an indication of the speed thereof which is adapted to produce a first indication when the speed is equal or greater than a predetermined proportion of a preselected desired speed and a second indication when the speed is less than the predetermined proportion of the desired speed.

Another object of this invention is to provide a monitor in accordance with the foregoing object, which is further adapted to provide a continuous indication of the proportion of the speed of the belt to a preselected desired speed.

Yet another object of this invention is to provide a monitor in accordance with the foregoing objects, which is further adapted to shut off power to a drive means for the belt, when the speed thereof is below a predetermined proportion of a desired speed, and to provide an indication thereof.

Still another object of this invention is to provide a monitor in accordance with the foregoing objects, which is adapted to provide simple and easy to read indicators, at a location remote from the belt being monitored thereby.

Yet another object of the present invention is to provide a monitor in accordance with the foregoing objects, especially suitable for use in a grain elevator or the like and which is adapted to reliably measure actual belt speed in a leg of a grain elevator and is not affected by such factors as misaligned buckets or bucket holding bolts, bolt indentations, imperfections or overlap splices in the belt.

Still another object of this invention is to provide a monitor in accordance with the foregoing objects, which is relatively simple to install and minimizes the danger of over heating and fire in the belt being driven, high voltage or high current electric power, sparks or the like.

Still another object of this invention is to provide a monitor in accordance with the foregoing objects, which is adapted for use with a wide variety of belts whose desired speeds vary over a relatively wide range.

Briefly, in accordance with one form of the invention, a belt speed monitor for a grain elevator leg or the like includes sensor means installed on the up leg, adjacent the belt, for producing an electrical signal which varies systematically in accordance with the speed of the belt. The monitor also includes indicator means and circuit means connected between the sensor means and the indicator means to receive the electrical signal and produce a plurality of indication signals in response thereto for selectively energizing the indicator means to produce indications corresponding to the speed of the belt.

In a preferred embodiment, the sensor means comprises a traction wheel having magnetic pole pieces embedded therein, in direct contact with the belt, and pick-up means comprising a coil mounted adjacent the wheel for producing the electrical signal in response thereto. Also in a preferred embodiment, the circuit means includes an input circuit for producing an input signal which varies in proportion to the variation of the electrical signal and means for adjusting the input signal. This adjusting means functions so that when the electrical signal value corresponds to the desired belt speed, the input signal is at a predetermined level representing 100% of the desired speed of the belt.

In a preferred embodiment the circuit means also includes indicator circuit means for producing indication signals when the input signal is respectively above or below a value corresponding to a first predetermined proportion of the desired speed, and first and second indicators connected with the indicator circuit means for providing indications responsive to the signals therefrom. Also, in a preferred embodiment, the circuit means includes shut down circuit means for stopping the machine or moving belt in response to the input signals corresponding to the speed thereof being below a second predetermined proportion of the desired speed.

In a preferred embodiment, the monitor also includes a continuous indicating means, such as a meter or the like, for producing a continuous indication of the proportion which the speed of the belt bears to the desired speed.

The foregoing, as well as other objects and advantages of the invention will be appreciated from the following detailed description, together with the accompanying drawings wherein like reference numerals are used throughout to designate like elements and components.

BRIEF DESCRIPTION OF THE DRAWINGS

FIG. 1 is a representation, in block diagrammatic form, of a monitor of the present invention, in conjunction with a moving belt, driven by a motor;

FIG. 2 is a perspective view of one embodiment of a display console suitable for use with the monitor of this invention;

FIG. 6 is a schematic circuit diagram of another portion of a monitoring circuit according to this invention.

DETAILED DESCRIPTION

Figure 4:
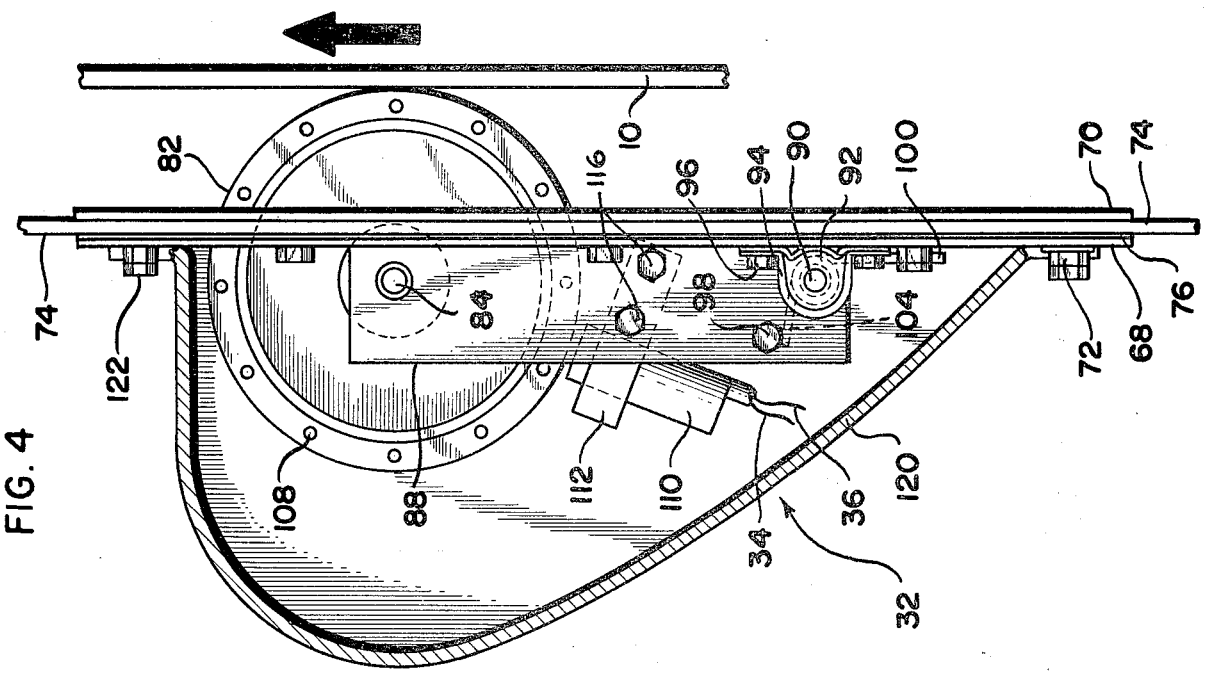
FIG. 4 is a side view of the sensor assembly of FIG. 3.

Referring now to FIG. 1, a belt 10 is driven by an electrically powered motor 12 via a suitable drive means 14. The motor 12 is connected by a line 13 to a conventional motor starter circuit 15, as known in the art. The motor starter circuit 15 includes a first input connected to one terminal 16 of a start switch 18 whose opposite terminal is connected to a first input 20 of indicator and control circuit 22 and to a terminal 26, which is connected to a second input of the motor starter circuit 15. A third input of the motor starter circuit 15 is connected to one terminal of a stop switch 28, whose opposite terminal is connected to a second input 30 of the indicator and control circuits 22. The indicator and control circuits 22, in accordance with one embodiment of the invention, are adapted to make or break a connection between the inputs 20 and 30 in response to predetermining conditions, as will be described in detail hereinbelow. This action of the circuit 22 causes the motor starter circuit 15 to alternatively complete or break the circuit between a suitable power source such as a three phase line 31 and the motor 12 in the fashion known in the art.

A sensor assembly 32 is provided adjacent the belt 10, and includes means for detecting the speed of the moving belt 10 and providing a signal which varies systematically in accordance with the speed of the belt 10, via lines 34 and 36 to the indicator and control circuit 22. A pair of terminals 38 and 40, are connected with a suitable source of power, such as a 120 volt 60 hertz AC line, and are connected to inputs 42 and 44 of the indicator and control circuits 22. The terminal 40 is also connected via a line 46 to an external indicator such as an alarm 48, whose opposite input is connected to an output terminal 50 of the indicator and control circuits 22. The line 46 and output terminal 50 are also connected to the inputs of a DC power supply 52 whose output is connected to a second, DC powered, remote indicator such as an alarm 54. The indicator and control circuits 22 include means for alternatively making or breaking the connection between the lines 44 and 50, to supply power to the alarm 48 and, via the DC power supply 52, to the DC powered alarm 54, to actuate the alarms in response to predetermined conditions, to be described hereinbelow.

Referring to FIG. 2, a display console 56 preferably contains the indicator and control circuits 22, and is of relatively convenient size, whereby it may be mounted, as desired, either adjacent or remote from the sensor assembly 32. For example, in most cases it will be convenient to mount the control console adjacent the motor start-stop control switches. The optional external alarm or indicator devices such as the alarms 48 and 54, may also be mounted in any convenient location and connected to the console 56 by appropriate lines or cables. A front panel 58 of the console 56 includes, in a preferred embodiment, display or indicator elements for providing indications related to the speed of the belt 10, as monitored via the sensor assembly 32. Three indicators 60, 62 and 64, in a preferred embodiment, comprise lamps. The indicator and control circuits 22 are adapted to energize or light the lamp 60 when the belt is running within a predetermined proportion of the desired speed. Similarly, the lamp 62 is energized or lighted by the indicator and control circuits 22 when the belt is running below a predetermined proportion of the desired speed. The third lamp 64 is connected with the indicator and control circuits 22 to be energized or lighted thereby when the speed of the belt, as detected by the sensor assembly 32, is below a second predetermined proportion of the desired speed.

The front panel 58 of the console 56 also includes a display or readout device, such as a meter 66 for providing a continuous indication or display of the speed of the belt in accordance with signals provided by the sensor assembly 32 via the circuits 22. The indicator and control circuits 22 are adapted to energize the meter for providing a continuous indication of the proportion which the actual speed of the belt 10 bears to the desired speed thereof, as for example, in terms of a percentage. It will be appreciated, then, that since the indicator and control circuits 22 are adapted to energize the indicators 60, 62 and 64 and the readout device 66 in accordance with predetermined proportions or percentages of a desired belt speed, that the absolute value of the belt speed is not significant. The indicator and control circuit 22 includes adjustable means, as will be described below, for adjusting the circuit 22 for being responsive over a wide range of absolute values of desired belt speeds for providing appropriate indications in accordance with the proportion the belt speed detected at the sensor 32 bears to the desired belt speed.

Figure 3:
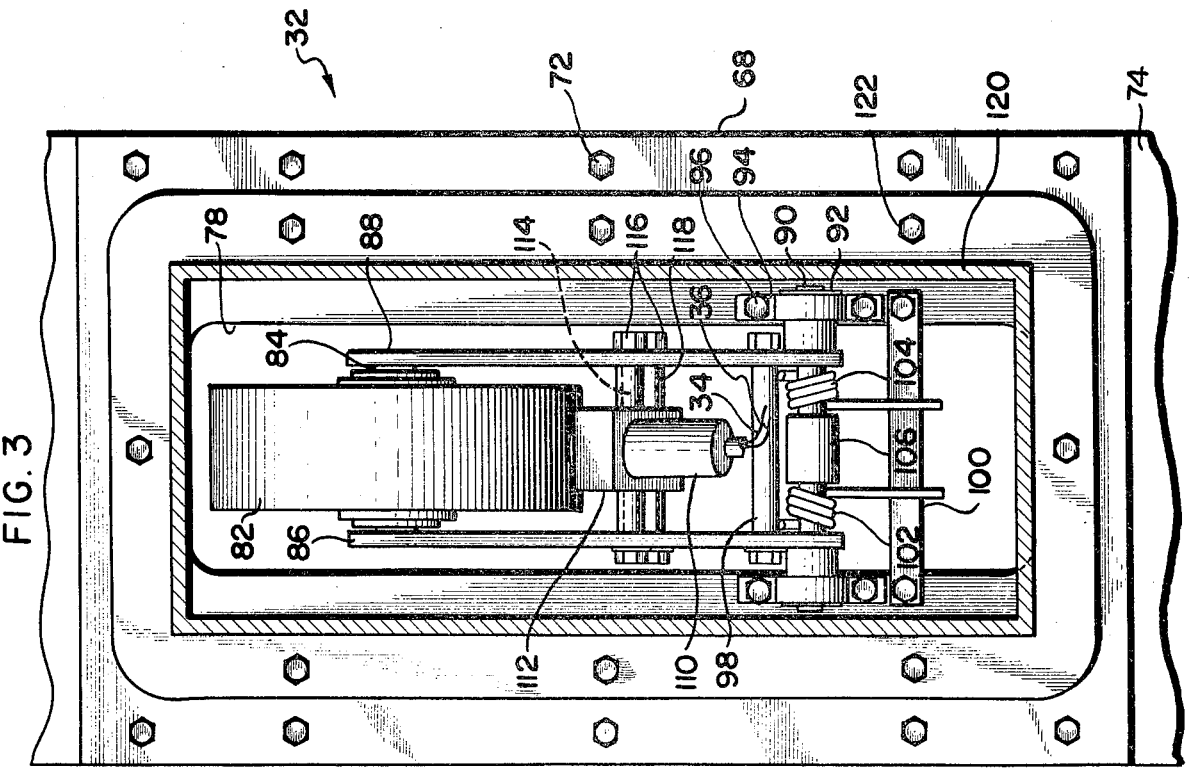
FIG. 3 is a top view of a sensor assembly according to this invention.

Referring now to FIGS. 3 and 4, the sensor assembly 32 is shown in additional detail. The sensor assembly is shown mounted on a conveyor structure such as a grain elevator. The elevator may be of any known construction and need not be described in detail. It suffices to state that the elevator or conveyor includes an endless member or belt 80 extending around pulleys or guides, not shown, and driven by the motor 14 through a suitable drive mechanism, also not shown. The belt 80 operates within a housing having a portion or up leg 74, which in the embodiment shown, is the up leg of the elevator. The sensor assembly includes a pair of mounting plates 68 and 70 attached by suitable means such as bolts 72 in firm engagement to opposite sides of the up leg 74. A gasket 76 is provided between the leg 74 and mounting plate 68. A suitable opening 78 is cut into leg 74, corresponding to a similar opening in the mounting plates 68 and 70 for enabling the sensor components to project therethrough for making contact with the belt 10.

An actuator member comprises a wheel 82 mounted on a shaft 84 rotably mounted by suitable bearing means at one end of a pair of parallel bearing plate 86, 88. The wheel 82 is extendable through the opening 78 to contact the belt 10 to be rotated thereby. Thus, the rotation of the wheel 82 is proportional to the speed of the belt 10. The ends of the bearing plates 86 and 88 opposite the shaft 84, are mounted on a second shaft 90. The shaft 90 is provided with suitable bearing means 92 which are mounted on the plate 68 by suitable means including brackets 94 and bolts or other fasteners 96, whereby the plates 86 and 88 with the wheel 82 and shaft 84 attached thereto are rotatable in unison with the shaft 90 in a plane perpendicular to that of the mounting plate 68. A cross member 98 is attached between the plates 86 and 88 adjacent and parallel the shaft 90, and a similar cross member 100 is attached across the opening 78 of the mounting plate 68 adjacent the mounting brackets 94 and parallel to the shaft 90. A left-hand spring 102 and a right-hand spring 104 are mounted on the shaft 90 inside of the plates 86 and 88 and spaced apart by a suitable spacer 106. Ends of the springs 102 and 104 are extended outwardly in either direction to abut the cross members 98 and 100, whereby the springs 102 and 104 are held in compression thereby. Thus, the springs 102 and 104 exert a force upon the bearing plates 86 and 88, via the cross member 98 mounted thereon, to urge the wheel 82 into engagement with the belt 10. It will be appreciated that the springs 102 and 104 permit the wheel 82 to substantially follow the surface of the belt 10. The wheel 82 is driven so that its rotational speed varies in substantially linear proportion to the speed of the belt 10 and is substantially unaffected by irregularities, such as splices or the like in the surface of the belt 10.

The wheel 82 includes a plurality of magnetic pole pieces 108 embedded therein, substantially at regular intervals and at the same radial distance from the center thereof. The magnetic pole pieces preferably comprise a magnetic material comprising a flexible plastic or rubber-like material binder and finally divided permanently magnetizable ferrite or other suitable material embedded therein. One such material is commercially available under the trademark Koroseal which is an extruded flexible magnetic material obtainable from the B. F. Goodrich Company and another is sold under the trademark Plastiform obtainable from the 3M Company. The remainder of the wheel 82 preferably is formed from a non-metallic and non-magnetizable material. Thus, the possibility of sparking occurring due to the frictional engagement between the wheel 82 or magnetic pole pieces 108 and the belt 10 is substantially eliminated.

A pick-up member including a coil or an inductor 110 preferably having a suitable core member permanently mounted therein is mounted in a holding bracket or block 112. The bracket or block 112 is attached to the plates 86 and 88 by suitable means such as shafts 114, attached to the plates 86 and 88 by suitable fasteners such as bolts 116. The shafts 114 are provided with suitable spacers 118 for positioning the bracket 112 and coil 110 mounted therein in alignment with the outer periphery of the wheel 82. Thus, the rotation of the magnetic pole pieces 108 in unison with the wheel 82, in response to the motion of the belt 10 in contact therewith, induces an alternating electrical signal in the coil 110 adjacent thereto, which is passed via the lines 34 and 36 to the indicator and control circuits 22 of FIG. 1. It will be appreciated that the electrical signal on the lines 34 and 36 comprises a low voltage, low current signal and no electrical power is applied to the sensor assembly or coil 110 thereof. Thus, the danger of fire or the like which might otherwise result from relatively higher voltage or higher current electrical signals in proximity to grain or the like being carried on the belt is substantially eliminated. A cover 120 over the wheel and pick-up coil assembly is held to the plate 68 by suitable fasteners such as bolts 122. The cover 120 serves to protect the aforementioned parts from dirt, dust or the like and provides further protection against the possibility of sparks due to any frictional engagement between the moving parts of the assembly 32.

Figure 5:
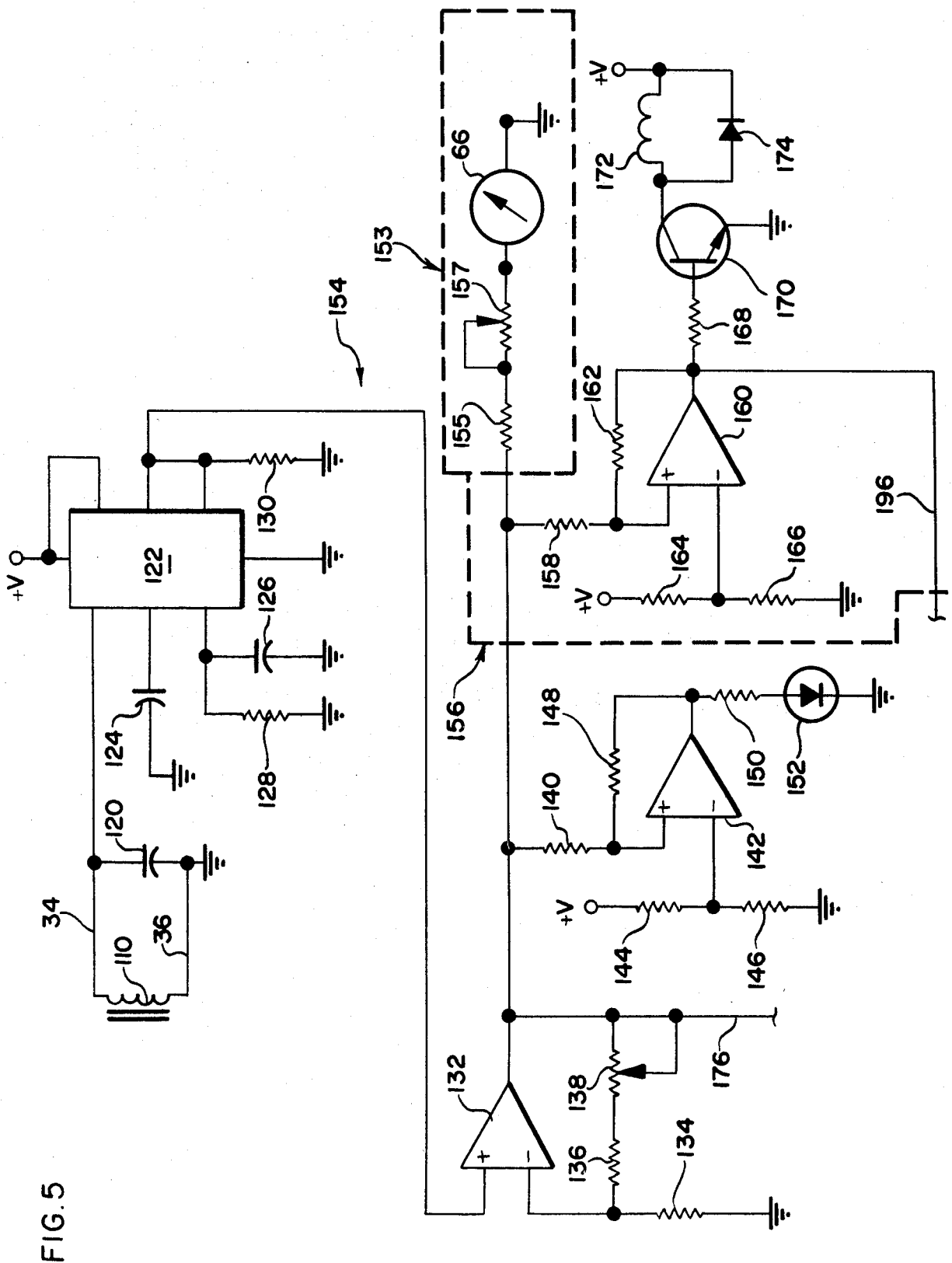
FIGS. 5 and 5A are schematic circuit diagram of a portion of a monitoring circuit according to this invention.

Referring now to FIG. 5, a portion of the indicator and control circuits 22 of FIG. 1 is shown in additional detail. The coil 110 is connected via the lines 34 and 36 to the inputs of the indicator and control circuits 22. The circuits 22 are preferably mounted in the console 56 of FIG. 2, which may be conveniently placed adjacent the power on/off switching control, such as the switches 18 and 28, for the motor 12, which may be located remote from the belt 10 and sensor assembly 32. A capacitor 124 is connected across the lines 34 and 36, the line 36 being connected to ground. The line 34 from the coil 110 is connected to an input of a frequency to voltage converter 122, which is provided with suitable connections to a positive voltage supply and to ground, and also suitable connections, as known in the art, via a capacitor 124 to ground, via the parallel combination of a capacitor 126 with a resistor 128 to ground, and via a resistor 130 to ground. The output of the frequency to voltage converter 122 is connected to ground via the resistor 130, and to the noninverting input of an operational amplifier 132, whose inverting input is connected via a resistor 134 to ground and via a series combination of a resistor 136 with a variable resistor 138 to the output thereof. The output of the operational amplifier 132 is connected via a resistor 140 to the noninverting input of an operational amplifier 142. The inverting input of the operational amplifier 142 is connected to the junction of a pair of series connected resistors 144 and 146 which form a voltage divider between a positive voltage supply and ground. The output of the operational amplifier 142 is connected via a feedback resistor 148 to the noninverting input thereof and via a resistor 150 to the anode of a light emitting diode (LED) 152, whose cathode is connected to ground.

The circuits of FIG. 5 thus far described comprise an input circuit means, designated generally 154, which functions as follows. The input signal on the line 34 from the coil 110 comprises an alternating signal, whose frequency is proportional to the rotational speed of the wheel 82 of the sensor assembly 32, which is in turn proportional to the speed of the belt 10. The frequency to voltage converter 122 presents a voltage signal at the noninverting input of the operational amplifier 132 which is proportional to the frequency of the signal input thereto at the line 34, and appropriately scaled thereby for driving the following stages. With the belt 10 running at its desired speed, the signal level at the output of the operational amplifier 132 is further adjustable by the variable resistor 138, to a desired constant, predetermined level which is selected to represent 100 percent of the desired speed of the belt. The proper adjustment of the variable resistor 138 is facilitated by the provision of the operational amplifier 142 and the LED 152. The operator need only adjust the variable resistor 138 until the LED 152 is lighted and then reverse the adjustment until the LED 152 just turns off, indicating the proper adjustment of the level of the signal at the output of the operational amplifier 132, to provide a scaled input signal to the following stages, corresponding to the proportions or percent of the belt speed detected, relative to the desired belt speed. Thus, the circuit is adapted to work with a relatively wide range of belt speeds, as represented by the signal at the input on the line 34 thereof. The provision of the input scaling or adjusting circuits just described present the same range of signal levels at the output of the operational amplifier 132, corresponding to the percent of the desired speed of the belt, without regard to the absolute speed thereof. As will be more fully explained later herein, the signals of interest in the following circuits are the signals corresponding to the proportion which the belt speed detected at the sensor bears to the desired speed of the belt, in terms of a percentage.

The output of the operational amplifier 132 is connected to the input of a readout or display circuit, designated generally 153, including the meter 66. A resistor 155 and a variable resistor 157 are connected in series between the output of the operational amplifier 132 and one side of the meter 66, whose other side is connected to ground. The variable resistor 157 is adjustable for providing an appropriate signal level to drive the meter 66, for providing a continuous indication or display of the proportion which the belt speed detected at the sensor bears to the desired belt speed, in terms of a percentage thereof.

The output of the operational amplifier 132 is also connected to the input of a first indicator circuit, designated generally 156, and in particular, via a resistor 158 to the noninverting input of an operational amplifier 160. The output of the operational amplifier 160 is connected via a feedback resistor 162 to the noninverting input thereof. The inverting input of the operational amplifier 160 is connected to the junction of a pair of resistors 164 and 166, connected as a voltage divider in series between a positive voltage supply and ground. The output of the operational amplifier 160 is connected via a resistor 168 to the base electrode of a transistor 170, whose emitter electrode is connected to ground. The collector electrode of the transistor 170 is connected to one side of a coil 172 whose opposite side is connected to a positive voltage supply. A diode 174 is connected in parallel with the coil 172, its anode being connected with the collector electrode of the transistor 170 and its cathode being connected with the positive voltage supply. The coil 172 comprises the coil of a first relay, to be described below. It will be appreciated, then, that the first indicator circuit means 156 will keep the transistor 170 turned on, energizing the coil 172, as long as the level of the signal from the output of the operational amplifier 132 is sufficiently high with respect to the signal at the inverting input of the operational amplifier 160, as set by choice of the resistors 164 and 166. The choice of the resistors 164 and 166 represents a first predetermined proportion or percentage of the desired speed of the belt, at which the transistor 170 will be switched on and off, energizing and de-energizing the coil 172, respectively, in response to the belt speed as represented by the input signal level at the noninverting input of the operational amplifier 160.

Figure 5A:
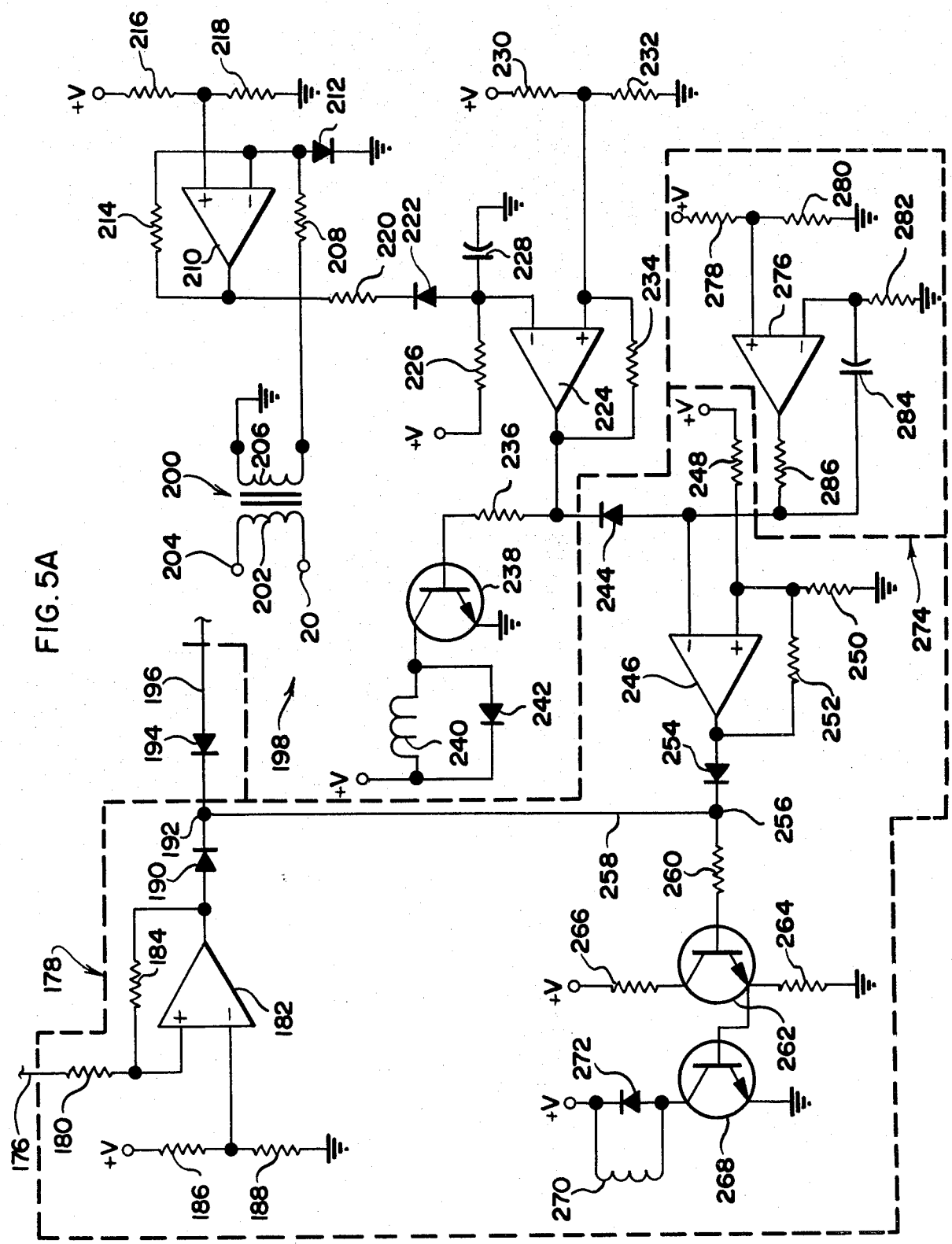

The output of the operational amplifier 132 is also connected via a line 176 to the input of a shut down circuit, designated generally 178 of FIG. 5A. The line 176 is connected via a resistor 180 to the noninverting input of an operational amplifier 182, whose output is connected via a feedback resistor 184 to the noninverting input thereof. The inverting output of the operational amplifier 182 is connected to the junction of a pair of resistors 186 and 188 which are connected as a voltage divider in series between a positive voltage supply and ground. The output of the operational amplifier 182 is connected to the anode of a diode 190 whose cathode is connected to a terminal 192. The terminal 192 is also connected to the cathode of a diode 194 whose anode is connected to a line 196 which is connected to the output of the operational amplifier 160. The operational amplifier 182 operates equivalently to the operational amplifier 160, to produce a zero volt signal at its output when the belt speed is less than or equal to a predetermined proportion or percentage of the desired belt speed, as set by the choice of the resistors 186 and 188 at the inverting input thereof. The proportion or percent set by the choice of the resistors 186 and 188 is preferably equal to or less than the proportion or percent set by the resistors 164 and 166 at the inverting input of the operational amplifier 160.

A second indicator circuit, designated generally 198, includes a transformer designated generally 200, having one side of the primary winding 202 thereof connected to the terminal 20 from the start switch 18 of FIG. 1. The opposite side of the primary winding 202 is connected at a terminal 204 which is connected to the terminal 30 of FIG. 1 via a relay switch, to be described below. The secondary winding 206 of the transformer 200 has one side thereof connected to ground and the other side thereof connected via a resistor 208 to the inverting input of an operational amplifier 210, which input is also connected to the anode of a diode 212 whose cathode is connected to ground. A feedback resistor 214 is connected between the inverting input of the amplifier 210 and the output thereof. The noninverting input of the operational amplifier 210 is connected to the junction of a pair of resistors 216 and 218 which are connected in series between a positive voltage supply and ground to form a voltage divider. The output of the operational amplifier 210 is connected via a resistor 220 to the cathode of a diode 222 whose anode is connected to the inverting input of an operational amplifier 224. The inverting input of the operational amplifier 224 is also connected via a resistor 226 to a positive voltage supply and via a capacitor 228 to ground. The non-inverting input of the operational amplifier 224 is connected to the junction of a pair of resistors 230 and 232 which are connected in series between a positive voltage supply and ground to form a voltage divider. A feedback resistor 234 is connected between the output of the operational amplifier 224 and the non-inverting input thereof. The output of the operational amplifier 224 is connected via a resistor 236 to the base electrode of a transistor 238 whose emitter electrode is connected to ground. The collector electrode of the transistor 238 is connected to one side of a coil 240 whose opposite side is connected to a positive voltage supply. A diode 242 is connected in parallel with the coil 240, the anode thereof being connected to the collector of the transistor 238 and the cathode thereof being connected to the positive voltage supply. The coil 240 comprises the coil of a second relay, to be described below.

In operation, as long as current is flowing in the motor 12 of FIG. 1, current will be flowing through the primary winding 202 of the transformer 200, and therefore in the secondary winding 206 thereof. Thus, the transistor 238 will be turned on, via the operational amplifiers 210 and 224 and associated circuit elements, energizing the coil 240 as long as the current in the primary winding 202 is greater than zero. When the current in the primary winding is zero, indicating that the motor 12 is switched off, the transistor 238 will be turned off, de-energizing the coil 240.

The output of the operational amplifier 224 is also connected to the cathode of a diode 244 whose anode is connected to the inverting input of an operational amplifier 246. The non-inverting input of the operational amplifier 246 is connected via a resistor 248 to a positive voltage supply and via a resistor 250 to ground. A feedback resistor 252 is connected between the output of the operational amplifier 246 and the non-inverting input thereof. The output of the operational amplifier 246 is connected to the anode of a diode 254 whose anode is connected to a terminal 256, which terminal is also connected via a line 258 to the terminal 192. The terminal 256 is connected via a resistor 260 to the base electrode of a transistor 262 whose emitter electrode is connected via a resistor 264 to ground and whose collector electrode is connected via a resistor 266 to a positive voltage supply. The emitter electrode of the transistor 262 is also connected to the base electrode of a transistor 268, whose emitter electrode is connected to ground. The collector electrode of the transistor 268 is connected to one side of a coil 270 whose other side is connected to a positive voltage supply. A diode 272 is connected in parallel with the coil 270, the anode thereof being connected to the collector electrode of the transistor 268 and a cathode thereof being connected to the positive voltage supply. The coil 270 comprises the coil of a third relay, to be described below.

It will be appreciated from the foregoing description, that the coil 270 will be de-energized via the transistors 268 and 262 when the signal at the terminal 256 is at zero volts. The signal at the terminal 256 will be at zero volts when the outputs of the operational amplifiers 160, 182 and 246 are all at zero volts. As described above, the output of the operational amplifiers 160 and 182 will be at zero volts when the speed of the belt is less than or equal to first and second predetermined proportions of the desired speed. The output of the operational amplifier 246 will be at zero volts when the current in the primary winding 202 of the transformer 200 is greater than zero. It will be noted that the period of time for which the coil 270 will remain de-energized depends on the choice of the resistor 226 and capacitor 228 at the inverting input of the operational amplifier 224. In a preferred embodiment, the resistor 226 and capacitor 228 are chosen so that this time period is substantially 2.0 seconds.

A timing circuit 274 is included in a preferred embodiment for holding the output of the operational amplifier 246 high for a predetermined interval of time after the current in the primary winding of the transformer 200 begins to flow, as for example upon closure of the switch 18 of FIG. 1 to start the motor 12 and belt 10. An operational amplifier 276 has its non-inverting input connected to the junction of a pair of resistors 278 and 280 which are connected in series between a positive voltage supply and ground to form a voltage divider. The inverting input of the operational amplifier 276 is connected via a resistor 282 to ground and via a capacitor 284 to the inverting input of the operational amplifier 246. The output of the operational amplifier 276 is connected via a resistor 286 to the non-inverting input of the operational amplifier 246. Thus, with the addition of the timing circuit 274, the output of the operational amplifier 246 will remain at the supply voltage for a predetermined time interval after the motor 12 is switched on, and current begins to flow in a secondary winding 202, the time interval being determined by the choice of the resistor 282 and the capacitor 284.

Referring now to FIG. 6, the remainder of the indicator and control circuit 22 is shown. The coil 172 of the first indicator circuit 156 of FIG. 5 comprises the coil of a relay 288. Similarly, the coil 240 of the second indicator circuit 198 of FIG. 5A comprises the coil of a relay 290. The relay 288 has a first movable contactor or switch 292, one side of which is connected to the normal indicator lamp 60, and the other side of which is movable between a normally open terminal connected to the terminal 38 at the AC power supply input 42 and a normally closed terminal which is open circuited. The opposite side of the lamp 60 is connected to the opposite side of the AC power line at the terminal 40, via the input 44. A second movable contactor or switch 294 of the relay 288 is connected at one side thereof to an input of the alarm 48 at the output terminal 50. The opposite side of the switch 294 is movable between an open circuited normally open terminal and a normally closed terminal connected to one side of a contactor or switch 296 of the relay 290. The opposite side of the contactor 296 is movable between an open circuited normally closed terminal and a normally open terminal connected to the AC line terminal 38 via the input terminal 42. A third movable contactor or switch 298 of the relay 288 has one side thereof connected to one side of the low indicator lamp 62 and the other side thereof movable between an open circuited normally open terminal and a normally closed terminal connected to the AC line terminal 38 via the input terminal 42. A movable contactor or switch 300 of the relay 290 has one end thereof connected to the AC line terminal 38 via the input terminal 42 and the other side thereof movable between an open circuited normally open terminal and a normally closed terminal connected to one side of the shut down indicator lamp 64. The opposite sides of the low indicator lamp 62 and of the shut down indicator lamp 64, respectively, are connected to the AC line terminal 40, via the input terminal 44. A third replay 302 includes the coil 270 of the shut down circuit 178 of FIG. 5A. A movable contactor or switch 304 of the relay 302 has one side thereof connected to the terminal 204 of the primary winding 202 of the transformer 200 of FIG. 5A and the other side thereof movable between an open circuited normally closed terminal and a normally open terminal connected to the input terminal 30 from the stop switch 28 of FIG. 1.

In operation, when the motor 12 is running, current will flow through the primary winding 202 of the transformer 200, and thus the coil 240 of the relay 290 will be energized. Similarly, if the speed of the belt is in excess of the first and second predetermined proportions of the desired speed thereof, (as set by the resistors 164 and 166 and the resistors 186 and 188) the coil 270 of the relay 302 and the coil 172 of the relay 288 will also be energized. Thus, the contactor or switch 292 will be actuated into contact with the normally open terminal thereof connected to the AC line terminal 38, completing the AC power circuit to the normal indicator lamp 60, thereby lighting the lamp. Similarly, the contactors or switches 294 and 298 will be actuated to contact their open circuited normally open terminals, removing the AC power from the low indicator lamp 62, the alarm 48, and the DC power supply 52 for the remote alarm 54. Similarly, the contactor or switch 300 of the relay 290 will be actuated to its open circuited normally open terminal thereby removing power from the shut down indicator lamp 64. Also, the contactor switch 304 of the relay 302 will be actuated into contact with the normally open terminal thereof, completing the AC power circuit with the motor 12 via the terminal 30.

If the speed of the belt decreases below the first predetermined portion of the desired speed, as set by the resistors 164 and 166 of FIG. 5, the coil 172 of the relay 288 will be de-energized. Thus, the contactor 292 thereof will return to its normally closed terminal, removing power from the normal indicator lamp 60. Similarly, the contactor 298 of the relay 288 will return to its normally closed terminal, completing the AC power circuit to the low indicator lamp 62, thus lighting the lamp. Also, the contactor 294 of the relay 288 will return to contact its normally closed terminal, connected with the contactor 296 of the relay 290, which is still energized. Therefore, the AC power circuit is completed to the alarm 48 and to the DC power supply 52 for the alarm 54, thus sounding the alarms 48 and 54.

If the speed of the belt falls below the second predetermined proportion of the desired speed thereof, as set by the resistors 186 and 188 of FIG. 5A, and assuming that the time delay from start up of the motor 12 driving the belt, as set by the capacitor 284 and resistor 282 of timing circuit 274, has elapsed, the net signal at the terminal 256 will be substantially zero. (It will be remembered that the second predetermined proportion of desired speed is equal to or less than the first predetermined proportion thereof, therefore the output of the operational amplifier 160 will be substantially zero.) Therefore, the coil 270 of the relay 302 will be de-energized, causing the contactor 304 to move to its normally closed terminal, removing AC power from the transformer primary 202, and thus removing AC power from the motor 12. Therefore, the current in the primary 202 goes to zero, and the coil 240 of the relay 290 is also de-energized. Thus, the relays 288, 290 and 302 are all de-energized. Therefore, the contactor 292 of the relay 288 will remain at its normally closed terminal de-energizing the normal indicator lamp 60. Similarly, the contactor 298 thereof will remain at its normally closed terminal energizing the low indicator lamp 62. The contactor 296 of the relay 290 will return to its normally closed terminal de-energizing the alarms 48 and 54, and the contactor 300 thereof will return to its normally closed terminal energizing the shut down indicator lamp 64. Thus, with the motor 12 stopped, either due to the actuation of the stop switch 28 or due to the coil 270 of the relay 302 being de-energized as described, the external alarms 48 and 54 are disabled by the relay 290.

When the motor 12 is started, the coil 270 of the relay 302 is prevented from de-energizing and thus cutting off power to the motor 12 by the time delay circuit 274, the resistor 282 and capacitor 284 thereof preferably being chosen to hold the output of the operational amplifier 246 at the supply voltage for substantially 30 seconds, to allow the belt to come up to speed.

While a preferred embodiment has been shown and described herein, it is not intended to limit the invention thereto. Changes and modifications may become apparent to those skilled in the art and will be understood as forming a part of this invention insofar as they come within the spirit and scope of the appended claims.

The invention is claimed as follows:

1. A monitor for detecting and indicating at least one predetermined percentage ratio of the speed of a movable member to a desired speed, said movable member including drive means, said monitor comprising: sensor means for producing a sensor signal which varies systematically in accordance with said speed of said movable member, indicator means, and circuit means connected between said sensor means and said indicator means to receive said sensor signal and produce indication signals in response thereto for selectively energizing said indicator means for producing an observable indication of said at least one predetermined percentage ratio of said speed of said movable member to said desired speed, wherein said circuit means includes operator adjustable input circuit means includes operator adjustable input circuit means for adjusting input circuit means for adjusting said sensor signal to a predetermined level representing 100% of said desired speed of said movable member when said movable member is at said desired speed, said predetermined level being the same for any desired speed, said input circuit means thereby converting said sensor signal to an input signal whose value is proportional to the percentage ratio of the movable member speed to the desired speed, said monitor further including shutdown circuit means coupled between said input circuit means and said drive means and responsive to said input signal for de-energizing said drive means when the ratio of the speed of said movable member to the desired speed is at or below a second predetermined percentage which is less than or equal to said first predetermined percentage ratio and wherein said circuit means further includes means for disabling said shutdown circuit means for a predetermined period of time following energization of said drive means for allowing said movable member to come up to speed and timing means coupled with said shutdown circuit means for disabling said shutdown circuit means at a predetermined time interval after de-energization of said drive means, thereby re-energizing said drive means.

2. A monitor according to claim 1 wherein said circuit means further includes first indicator circuit means responsive to said input signal for producing a first one of said indication signal means when said input signal is above a first predetermined value corresponding to a first predetermined percentage ratio of said movable member speed to said desired speed.

3. A monitor according to claim 2 wherein said indicator means includes a first indicator means responsive to said first one of said indication signal means for producing an observable indication corresponding to the ratio of the speed of said movable member to said desired speed being above said first predetermined percentage ratio, and a second indicator means responsive to the absence of said first one of said indication signal means to provide an observable indication corresponding to the ratio of the speed of said movable member to said desired speed being at or below said first predetermined percentage ratio.

4. A monitor according to claim 3 wherein said circuit means further includes shut down circuit means responsive to said input signal for producing a shut down signal when said input signal is at or below a predetermined value corresponding to a second predetermined percentage ratio of said movable member speed to said desired speed, and means for stopping said drive means of said movable member in response to said shut down signal.

5. A monitor according to claim 4 wherein said circuit means further includes means connected with said drive means and responsive thereto for producing a second one of said indication signals in response to to the stopping of said drive means and said indicator means includes a shutdown indicator responsive to said stopping of said drive means for producing an observable indication corresponding to the stopping of said drive means.

6. A monitor for detecting slippage of a movable continuous belt or the like with respect to a motor powered belt drive, said monitor comprising: sensor means for producing a sensor signal which varies in a predetermined fashion in accordance with the speed of said belt, alarm means, input circuit means including operator adjustable means for converting said sensor signal to an input signal having a value corresponding substantially to the percentage ratio of the speed of said belt to the speed of said belt drive, first circuit means coupled between said input circuit means and said alarm means for receiving said input signal and for energizing said alarm means for receiving said input signal and for energizing said alarm means when the ratio of the speed of said belt to the speed of the motor powered belt drive is at or below a first predetermined percentage, thereby indicating a predetermined amount of slippage of the belt and second circuit means responsive to energization and de-energization of said motor for disabling said alarm means when said motor is de-energized, said monitor further including shutdown circuit means coupled between said input circuit means and said motor and responsive to said input signal for de-energizing said motor when the ratio of the speed of said belt to the speed of the belt drive is at or below a second predetermined percentage which is less than or equal to said first predetermined percentage ratio and wherein said second circuit means further includes means for disabling said shutdown circuit means for a predetermined period of time following energization of said motor for allowing said belt to come up to speed and timing means coupled with said shutdown circuit means for disabling said shutdown circuit means at a predetermined time interval after de-energization of said motor, thereby re-energizing said motor.

7. A monitor according to claim 6 wherein said sensor means comprises rotatable wheel means, means for yieldably biasing said wheel means into frictional engagement with said belt to be rotated thereby substantially free of relative slippage therebetween, magnet means attached to said wheel means to rotate in unison therewith and pick-up means including coil means mounted adjacent said wheel means for producing said sensor signal in response to the rotation of said magnet means.

8. A monitor according to claim 6 further including an indicator connected with said input circuit means for producing an observable indication in response to said input signal and corresponding to the speed of said belt in terms of a percentage of said belt drive speed.

* * * * *